United States Patent [19]

DiGiulio

[11] 4,439,547

[45] * Mar. 27, 1984

[54] ANTI-LUMPING AND FAST-COOL VINYL AROMATIC EXPANDABLE POLYMER PARTICLES

[75] Inventor: Adolph V. DiGiulio, Wayne, Pa.

[73] Assignee: Atlantic Richfield Company, Los Angeles, Calif.

[*] Notice: The portion of the term of this patent subsequent to Dec. 27, 2000 has been disclaimed.

[21] Appl. No.: 495,317

[22] Filed: May 16, 1983

Related U.S. Application Data

[62] Division of Ser. No. 462,157, Jan. 31, 1983.

[51] Int. Cl.$^3$ .............................................. C08J 9/18
[52] U.S. Cl. ....................................... 521/56; 521/57; 521/59; 521/60; 521/139; 521/140; 525/314; 525/901
[58] Field of Search ................. 525/314, 901; 521/56, 521/59, 60, 139, 140

[56] References Cited

U.S. PATENT DOCUMENTS

| | | | |
|---|---|---|---|
| 2,857,339 | 10/1958 | Colwell | 521/59 |
| 2,857,340 | 10/1958 | Colwell | 521/59 |
| 3,558,534 | 1/1971 | Niechwiadowicz | 521/59 |
| 3,956,203 | 5/1976 | Burger | 521/59 |
| 3,972,843 | 8/1976 | DeJong | 521/59 |
| 4,269,871 | 5/1981 | Blommers et al. | 521/59 |
| 4,304,881 | 12/1981 | Aoki et al. | 525/314 |

*Primary Examiner*—Morton Foelak
*Attorney, Agent, or Firm*—Lewis J. Young

[57] ABSTRACT

Expandable vinyl aromatic polymers are produced, which exhibit anti-lumping properties and fast-cool properties upon formation of foamed articles therefrom, by polymerizing a vinyl aromatic monomer, in which is dissolved 0.5–4.0 percent, based on the monomer, of a graded diblock rubbery copolymer of 2–50 percent of polymerized vinyl aromatic monomer and 50–98 percent conjugated diene, the polymerization forming vinyl aromatic polymer containing the graded diblock rubbery copolymer, and impregnating the polymer so produced, with a blowing agent.

4 Claims, No Drawings

ANTI-LUMPING AND FAST-COOL VINYL AROMATIC EXPANDABLE POLYMER PARTICLES

This is a divisional of application Ser. No. 462,157 filed Jan. 31, 1983.

Expandable vinyl aromatic polymer particles, such as polystyrene beads, have a tendency to form agglomerates or lumps during the pre-expansion of the particles to prepare them for molding process. After formation of the polymer particles, they are normally pre-expanded, such as is described in U.S. Pat. No. 3,023,175 and U.S. Pat. No. 3,577,360 and the pre-expanded particles are then used in the molding of foamed articles. The addition of various additives to pre-treat the beads and prevent lumping has been suggested. For example, beads have been coated with lubricants such as zinc stearate or have been contacted with a solution of sodium stearate and citric acid, an alcohol solution of hydroxyoleamide, kaolin coated with hydroxyethylated or hydroxypropylated amide of fatty acids, calcium polysilicate, glycerol mono-stearate and various combinations of inorganic or organic reagents. Such post additive approaches have met with varying degrees of success in eliminating lumping but most suffer in some respect due to the difficulty of consistently coating the beads uniformly, and thus a bead product that is non-lumping and retains a good fusability is not obtained consistently. In the case of inorganic anti-lump agents, too high a level of the agent will adversely affect fusion. In addition, the equipment costs for post-treating impregnated beads to produce non-lumping pre-puff can be very expensive.

It would thus be highly desirable to produce vinyl aromatic polymer particles which were inherently non-lumping and still retained or had improved foam properties when expanded and molded.

In U.S. Pat. No. 3,558,534, a process is described for preparing expandable vinyl aromatic polymer beads containing 0.25–0.9% of a styrene-butadiene rubbery polymer. The product is described as exhibiting antistatic properties and had a reduced tendency to clump. The description of the process states that the amount of the rubbery polymer added is critical and that 0.25 to 0.90%, preferably 0.4–0.75% of the rubbery polymer is required. Higher amounts of the rubbery polymer are said to give an unsatisfactory product in that non-uniform cell size in the pre-puff and an inability to pre-expand to a sufficiently low bulk density will result.

In addition to the problem of lumping of beads, a second problem arises in the cooling time required for forming of foamed articles from expandable vinyl aromatic polymer particles.

After the pre-expanded particles are fed to a mold cavity, which defines the shape of the foamed structure to be produced, the particles are heated above their softening point, such as by steam injected into the mold under pressure, and the particles expand to fill the mold cavity and fuse together to form a foamed article. After the particles have been treated in the mold to produce a foamed article, the article must be cooled for a relatively long time, depending on the size of the article, before it can be removed from the mold in a self-supporting state so as to retain it shape outside the mold. Since such foamed articles have good insulating properties, the cooling time in the mold consumes a significant part of the molding cycle and restricts the number of foamed articles that can be produced from a mold during a given time period.

The cooling time is not appreciably reduced by applying cooling media to the surface of the article or the mold surface since the heat transfer through the foamed article is extremely slow. Such slow heat transfer is evident by the insulative properties of such foamed articles. If such articles are removed from the confines of the mold too soon, the softness of the polystyrene and the pressure due to the hot interior of the article will cause the article to bulge and lose its desired shape.

Processes have been provided to reduce mold cooling time by addition of various compounds to polystyrene beads during polymerization in aqueous suspensions, such as are described in U.S. Pat. No. 3,389,097 and U.S. Pat. No. 3,503,908, or coating of polystyrene beads with surface active agents, such as is described in U.S. Pat. No. 3,480,570.

I have found that vinyl aromatic polymer particles in which specific graded diblock rubbery copolymers have been incorporated by polymerizing solutions of the vinyl aromatic monomer and the graded diblock rubbery copolymer, and which particles have been impregnated with a blowing agent, exhibit non-lumping properties when pre-expanded and fast-cool characteristics in formation of foamed articles therefrom.

BRIEF SUMMARY OF THE INVENTION

Expandable polymer particles, which exhibit anti-lumping properties and fast-cool properties, are produced by adding to an aqueous suspension system a vinyl aromatic monomer in which is dissolved 0.5–4.0 percent by weight, based on the monomer, of a graded diblock rubbery copolymer of 2–50 weight percent of polymerized vinyl aromatic monomer and 50–98 percent conjugated diene, and effecting polymerization to form vinyl aromatic polymer particles containing said graded diblock rubbery copolymer, and impregnating the polymer particles with a blowing agent to form expandable vinyl aromatic polymer particles containing the graded diblock rubbery copolymer therein.

DESCRIPTION OF THE INVENTION

The present process provides for the production of expandable vinyl aromatic polymers having incorporated therein graded di-block rubbery copolymers and which particles exhibit anti-lumping behavior when pre-expanded, and which pre-expanded particles exhibit fast-cool properties when molded.

Such vinyl aromatic polymers may be produced from various vinyl aromatic monomers such as styrene, alpha-methylstyrene, para-methylstyrene, para-t-butylstyrene, mono-chlorostyrene, dichlorostyrene, or mixtures thereof; as well as copolymerization of such vinyl aromatic monomers with monomers such as divinylbenzene, alkyl and allyl acrylates and methlacrylates, acrylonitrile, maleic anhydride, and the like, wherein the vinyl aromatic monomer is present in at least 50% by weight of the copolymer. The most common and preferred vinyl aromatic monomer is styrene or p-methylstyrene.

In accordance with the present process, the polymerization of the vinyl aromatic monomer is effected in a stable aqueous suspension in the presence of 0.5 to 4.0 percent by weight, and preferably 1 to 3 percent by weight based on the vinyl aromatic monomer of a graded diblock rubbery copolymer so as to incorporate the graded diblock rubbery copolymer in the polymer particles produced. The graded diblock rubbery copolymer is dissolved in the vinyl aromatic monomer and the solution is suspended and polymerization effected under conventional polymerization conditions.

Suspension polymerization techniques are well known. For example, a preferred method employs a suspension system comprised of an inorganic suspending agent, such as tricalcium phosphate and sodium bisulfite modifier. Other preferred suspension systems employ organic suspension stabilizers alone, such as polyvinyl alcohol, hydroxyethyl cellulose, polyvinyl pyrrolidone and the like. Equally useful suspension systems may employ combinations of inorganic and organic suspending agents, for example tricalcium phosphate and polyvinyl alcohol. An important advantage of the aqueous suspension systems is that the desired polymer particles may be obtained as beads of optimum size.

The polymerizations may be effected after immediate suspension of the monomer-graded diblock rubbery copolymer solution, or the monomer-block copolymer solution may be mass polymerized partially, then suspended and the polymerization completed in aqueous suspension. The polymer products of this invention can, of course, be produced by any of the known techniques, such as mass, suspension, or emulsion polymerization.

As used herein, the term "particles" is meant to cover beads, pellets, coarse grindings, and any other shape having sufficient porosity to allow impregnation without hard cores.

The graded diblock rubbery copolymer is present in an amount of 0.5-4.0 weight percent, based on the weight of the vinyl aromatic monomer and is preferably present in an amount of between 1.0 to 3.0 percent.

The graded diblock rubbery copolymer usable in the present process are those block copolymers containing 2-50 percent by weight of polymerized vinyl aromatic monomer and 50-98 percent by weight of a polymerized conjugated diene. The vinyl aromatic monomer may be styrene or alpha-methylstyrene. The conjugated diene may be butadiene or isoprene.

Such graded diblock rubbers can be made by known processes involving anionic initiators such as butyl lithium.

Especially useful graded diblock rubbers are those B→A type block copolymers in which each A block is essentially polymerized vinyl aromatic monomer with a minor amount of a conjugated diene, and each B block is essentially a conjugated diene polymer with a minor amount of vinyl aromatic monomer. The arrow, →, represents an area wherein the copolymer changes gradually from a copolymer high in diene to a copolymer high in vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominantly polydiene, but as the diene is depleted the later polymer formed is predominantly polyvinyl aromatic monomer.

The polymerization must be run in the absence of polar compounds because of the known effect of polar compounds as randomizing agents for such anionic copolymerization. Such copolymer rubbers are also available commercially, as for instance Stereon 720, a product having 90% by weight butadiene and 10% by weight styrene with 55% by weight of the styrene appearing as polystyrene blocks; and Stereon 840, a product having 56% by weight butadiene and 44% by weight styrene; both products of Firestone Synthetic Rubber & Latex Co.

The process of the present invention may be used with monomer-graded diblock rubber copolymer solution to water ratios in the suspension which vary from about 0.3 to 1.5 parts by weight monomer solution per 1.0 part by weight water. The free-radical initiating catalysts which are added to the suspension system are the conventional oil-soluble (monomer soluble) catalysts such as organic peroxides, e.g. benzoyl peroxide and t-butyl perbenzoate. Other free-radical producing catalysts that may be used in the invention include azobisisobutyronitrile. Conveniently, conventional amounts of such catalysts are used in the invention.

The time and temperature cycles for the polymerization may be those conventionally employed. Conveniently, the cycle described in Grim, U.S. Pat. No. 2,673,194, or the two-stage temperature cycle described in D'Alelio, U.S. Pat. No. 2,692,260 is employed. With such a two-stage cycle, in the first stage an elevated temperature of about 50°-90° C. is used for a period of about 3-7 hours, and a second stage uses polymerization temperatures in a range of about 100°-150° C. for a period of about 0.25-5.0 hours.

The vinyl aromatic polymer particles, having the graded diblock rubbery copolymer incorporated therein, are rendered expandable by impregnating the particles with between 3-12 percent of a volatile blowing agent such as a gas or an agent which will produce a gas on heating. Such blowing agents are preferably one or more compounds selected from aliphatic hydrocarbons containing from 4 to 6 carbon atoms in the molecule, including butane, pentane, cyclopentane, hexane, cyclohexane, and the halogenated hydrocarbons which boil at a temperature below the softening point of the vinyl aromatic polymer. Such blowing agent, and processes for impregnating the vinyl aromatic polymer particles therewith, are well known, such as for example is described in U.S. Pat. No. 2,983,692. It is well known to those skilled in the art, that the blowing agent, or mixture of blowing agents, may be incorporated into the polymer particles during the aqueous suspension polymerization of monomer solutions.

The modified vinyl aromatic polymer particles, containing a volatile blowing agent, generally in an amount of about 3-12 percent, are pre-expanded by exposing the particles to heat, such as by subjecting them to steam, hot air or hot water, for example by use of a pre-expander as described in U.S. Pat. No.3,023,175, as is commercially done. The pre-expanded particles are then permitted to stand under atmospheric conditions for a period of time, such as two hours to two days prior to charging the pre-expanded, aged particles to a mold for the formation of foamed articles.

It will be obvious to those skilled in the art that the present process may also be used for vinyl aromatic polymer particles that contain various other additives, such as flame retardant agents, dyes, pigments, antistatic agents, plasticizers, and the like.

The invention is further illustrated by the following examples wherein parts and percentages are by weight unless otherwise indicated.

EXAMPLE I

To a series of 12 oz. crown cap bottles there was charged 100 g water, 0.0003 g sodium bisulfite, 0.3 to 1.0 g tricalcium phosphate (TCP), 0.03 g benzoyl peroxide, 0.05 g t-butyl-perbenzoate, and 100 g of a styrene-diblock rubbery copolymer solution containing the amount of graded diblock rubbery copolymer listed in Table I, which was a rubber having 90% by weight butadiene and 10% by weight styrene (Stereon 720 by Firestone Synthetic Rubber & Latex Co.). The bottles were capped and suspension polymerization effected by end-over-end agitation of the bottles in a heated oil bath at 90° C. for a 6 hour period, followed by a 4 hour period at 120° C., and cooling to 25° C. over a period of 2 hours. The contents of the bottles were emptied and acidified to pH of 1.0 with hydrochloric acid and the removed polymer beads washed with water. The recovered beads were separated by sieving with different mesh sieves (U.S. Standard Sieve). A −25+40 bead size denotes beads which passed through a 25 mesh sieve and were retained on a 40 mesh sieve. Similarly, a −16+25 beads size denotes the beads which passed through a 16 mesh sieve and were retained on a 25 mesh sieve.

Portions of the beads were impregnated with n-pentane by charging to 12 oz. bottles, 100 g water containing the type and amount of surfactant listed in Table I, and 0.5–1.0 g tricalcium phosphate, 100 g beads and 8.1 g n-pentane. The bottles were capped and heated at 112° C. for 2 hours with end-over-end agitation. After cooling to room temperature the contents were acidified to a pH of about 1.0, centrifuged, filtered and washed with water, then tray dried at room temperature.

Beads were next pre-expanded in a loosely-capped unstirred five gallon batch expander by heating for two minutes in steam delivered from a 0.25 inch line at a pressure of 12 psig to give densities of approximately 1.0 pound per cubic foot (pcf), while higher densities were attained by bleeding air into the steam line to reduce the steam temperature when conducting the pre-expansion or by shortening the time of contact. After aging overnight, the beads were molded into cylindrical moldings 2 inches in thickness and 8 inches in diameter. The determination of lumping of the pre-expanded beads was made by screening the pre-expanded beads through a 0.187 inch opening and the percent lumping determined by weighing the residue of fused pieces on the screen; with heavy=>20%, moderate=~12%, light-=5-10% and very light=0-5% lumps. Cool times were determined and the molded specimens examined for appearance, dimensional stability and degree of fusion.

The results are listed in Table I:

TABLE I

| Run No. | A-B Block Copolymer (%) | Surfactant (g) | Bead Size | Density of Pre-Puff (pcf) | Cool Time (sec) | Lumping |
|---|---|---|---|---|---|---|
| 1 | 0 | 0.15 (a) | −25 + 40 | 1.53 | 105 | heavy |
| 2 | 0 | 0.16 (b) | −25 + 40 | 1.67 | 103 | heavy |
| 3 | 1 | 0.16 (b) | −25 + 40 | 1.76 | 67 | moderate |
| 4 | 1 | 0.15 (a) | −25 + 40 | 1.78 | 72 | moderate |
| 5 | 2 | 0.16 (b) | −25 + 40 | 1.88 | 44 | light |
| 6 | 2 | 0.15 (a) | −25 + 40 | 1.90 | 52 | light |
| 7 | 3 | 0.16 (b) | −25 + 40 | 1.60 | 46 | very light |
| 8 | 3 | 0.16 (b) | −16 + 25 | 1.52 | 68 | very light |
| 9 | 3 | 0.15 (a) | −16 + 25 | 1.40 | 71 | very light |
| 10 | 0 | 0.16 (b) | −16 + 30 | 1.64 | 148 | moderate |
| 11 | 0 | 0.16 (b) | −16 + 30 | 1.08 | 81 | heavy |

(a) an alkylaryl polyether of octylphenol containing 9–10 ethylene oxide units (Triton X-100; Rohm & Haas Co.)
(b) an alkylaryl polyether of octylphenol containing 16 ethylene oxide units (Triton X-165; Rohm & Haas Co.)

Formed article appearance was good, as was fusion of the beads on foaming and dimensional stability.

EXAMPLE II

The procedures of Example I were repeated except that the A-B diblock copolymer rubber was a rubber having 56% by weight butadiene and 44% by weight styrene (Stereon 840 by Firestone Synthetic Rubber & Latex Co.). The results are listed in Table II:

TABLE II

| Run No. | A-B Block Copolymer (%) | Surfactant (g) | Bead Size | Density of Pre-Puff (pcf) | Cool Time (sec) |
|---|---|---|---|---|---|
| 1 | 1 | 0.16 (b) | −16 + 25 | 1.40 | 72 |
| 2 | 1 | 0.15 (a) | −16 + 25 | 1.42 | 95 |
| 3 | 2 | 0.16 (b) | −16 + 30 | 1.46 | 60 |
| 4 | 2 | 0.15 (a) | −16 + 30 | 1.48 | 64 |
| 5 | 3 | 0.16 (b) | −25 + 40 | 1.64 | 29 |

(a) and (b) same as in Table I.

Fusion and appearance of the foamed moldings were good in all cases.

EXAMPLE III

Polystyrene −16+30 mesh beads containing 2.0 percent of either Stereon 720 (I) or Stereon 840 (II) were made in a stirred 100-gallon reactor using suspension polymerization recipes and cycles comparable to those used in Example I, except that the final finishing temperature was 130°–135° C. for two hours. The beads were impregnated and treated according to the procedure of Example I, and the pre-expanded beads produced, showed very light lumping and, on molding, showed the cool times as shown in Table III.

TABLE III

| Run No. | A-B Block Copolymer (2%) | Surfactant (g) | Density of Pre-Puff (pcf) | Cool Time (sec) |
|---|---|---|---|---|
| 1 | I | 0.16 (b) | 1.64 | 64 |
| 2 | I | 0.15 (a) | 1.64 | 68 |
| 3 | II | 0.16 (b) | 1.62 | 50 |
| 4 | II | 0.16 (a) | 1.60 | 56 |

(a) and (b) same as in Table I.

EXAMPLE IV

Example III was repeated except for the following changes: 0.16 g Triton X-165 was utilized in all four runs as surfactant; impregnation temperature was varied as listed in Table IV; and the beads were fluid bed dried rather than tray dried. A-B Block Copolymer I denotes Stereon 720, while II denotes Stereon 840. The milder impregnation conditions also provided exceptionally fast cool, as shown in the results listed in Table IV:

TABLE IV

| Run No. | A-B Block Copolymer (2%) | Impregnation Cycle Temp °C. | Impregnation Cycle Time (hrs.) | Drying Fluid Bed (25°C.) (min.) | Density Pre-Puff (pcf) | Cool Time (sec) |
|---|---|---|---|---|---|---|
| 1 | I | 112 | 1 | 24 | 1.03 | 29 |
|   |   | 112 | 1 |   | 1.48 | 52 |
| 2 | II | 112 | 1 | 33 | 1.01 | 35 |
|   |   | 112 | 1 |   | 1.40 | 55 |
| 3 | I | 100 | 2 | 30 | 0.98 | 22 |
|   |   | 100 | 2 |   | 1.40 | 41 |
| 4 | II | 100 | 2 | 50 | 0.94 | 28 |
|   |   | 100 | 2 |   | 1.38 | 47 |

What is claimed is:

1. Expandable vinyl aromatic polymer particles consisting of vinyl aromatic polymer particles containing dispersed throughout (1) 0.5 to 4.0 percent by weight of a graded diblock rubbery copolymer of 2-50 weight percent of polymerized vinyl aromatic monomer and 50-98 weight percent of polymerized conjugated diene and (2) a blowing agent; said expandable particles exhibiting anti-lumping properties when pre-expanded and fast-cool properties in molded products produced there from.

2. Expandable polystyrene particles consisting of polystyrene particles containing dispersed throughout (1) 0.5 to 4.0 percent by weight of a graded diblock rubbery copolymer of 2-50 weight percent of polystyrene and 50-98 weight percent of polybutadiene (2) a blowing agent; said expandable particles exhibiting anti-lumping properties when pre-expanded and fast-cool properties in molded products produced there from.

3. The expandable particles of claim 1 wherein said graded diblock rubbery copolymer rubber is formed from a vinyl aromatic monomer selected from the group consisting of styrene and alpha-methylstyrene, and from a conjugated diene selected from the group consisting of butadiene and isoprene.

4. The expandable particles of claim 1 wherein said blowing agent is selected from the group consisting of aliphatic hydrocarbons having 4 to 8 carbon atoms, halogenated hydrocarbons which boil at a temperature below the softening point of the vinyl aromatic polymer, and mixtures thereof.

* * * * *